United States Patent
An et al.

(10) Patent No.: US 10,789,112 B2
(45) Date of Patent: Sep. 29, 2020

(54) DEVICE LIFESPAN ESTIMATION METHOD, DEVICE DESIGN METHOD, AND COMPUTER READABLE STORAGE MEDIUM

(71) Applicant: SAMSUNG ELECTRONICS CO., LTD., Suwon-si, Gyeonggi-do (KR)

(72) Inventors: Jang Hyuk An, Yongin-si (KR); Seong Beom Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 222 days.

(21) Appl. No.: 15/995,182

(22) Filed: Jun. 1, 2018

(65) Prior Publication Data

US 2018/0276061 A1  Sep. 27, 2018

(30) Foreign Application Priority Data

Sep. 14, 2017  (KR) .................. 10-2017-0117867

(51) Int. Cl.
*G06F 11/00* (2006.01)
*G06F 11/30* (2006.01)
*G06F 11/07* (2006.01)
*G06F 11/34* (2006.01)

(52) U.S. Cl.
CPC ........ *G06F 11/008* (2013.01); *G06F 11/0706* (2013.01); *G06F 11/3058* (2013.01); *G06F 11/3409* (2013.01); *G06F 11/3414* (2013.01)

(58) Field of Classification Search
CPC ............... G06F 11/008; G06F 11/0706; G06F 11/3058; G06F 11/3409; G06F 11/3414
See application file for complete search history.

(56) References Cited

U.S. PATENT DOCUMENTS

| | | | |
|---|---|---|---|
| 7,447,919 B2 | 11/2008 | Liepe et al. | |
| 7,689,845 B2 | 3/2010 | Narendra et al. | |
| 8,266,572 B2 | 9/2012 | Kim et al. | |
| 9,483,068 B2 | 11/2016 | Raja et al. | |
| 9,678,817 B1* | 6/2017 | Hasbun Pacheco | G06F 11/0727 |
| 2005/0289380 A1* | 12/2005 | Davis | G06F 11/008 714/1 |
| 2011/0035535 A1* | 2/2011 | Locasio | G11C 16/349 711/103 |
| 2013/0145075 A1* | 6/2013 | Huang | G06F 12/0866 711/103 |
| 2014/0181363 A1* | 6/2014 | Hoang | G06F 12/0246 711/103 |
| 2014/0181585 A1* | 6/2014 | Hoang | G06F 11/3034 714/26 |
| 2014/0181595 A1* | 6/2014 | Hoang | G06F 11/3034 714/47.3 |
| 2014/0359350 A1* | 12/2014 | Plank | G06F 9/5027 714/10 |

(Continued)

*Primary Examiner* — Joshua P Lottich
(74) *Attorney, Agent, or Firm* — Volentine, Whitt & Francos, PLLC

(57) ABSTRACT

A device lifespan prediction method includes executing software loaded on a target device, using a user scenario case selected from a user scenario pool including one or more user scenario cases, collecting usage information for respective constituent block units of the target device based on execution of the software, and predicting a lifespan of the target device by analyzing the collected usage information.

20 Claims, 4 Drawing Sheets

(56) References Cited

U.S. PATENT DOCUMENTS

| | | | |
|---|---|---|---|
| 2015/0205657 A1* | 7/2015 | Clark | G06F 11/0727 714/47.3 |
| 2016/0378628 A1* | 12/2016 | Nguyen | G06F 11/008 714/40 |
| 2017/0060659 A1* | 3/2017 | Lee | G06Q 40/02 |

* cited by examiner

DEVICE LIFESPAN ESTIMATION METHOD, DEVICE DESIGN METHOD, AND COMPUTER READABLE STORAGE MEDIUM

CROSS-REFERENCE TO RELATED APPLICATION(S)

This U.S. non-provisional patent application claims the benefit of priority under 35 U.S.C. § 119 to Korean Patent Application No. 10-2017-0117867, filed on Sep. 14, 2017 in the Korean Intellectual Property Office, the disclosure of which is incorporated herein by reference in its entirety.

BACKGROUND

1. Field

The present disclosure relates to a device lifespan prediction method, a device design method, and a computer readable storage medium.

2. Description of Related Art

Design for reliability (DFR) refers to designing reliable products.

In the related art, a method of predicting the lifespan of chips has been used for a functional test solely using theoretical and speculative projections, such as by a full function vector, for a confirmation of operability of a chip to verify designs of semiconductor chips or the like.

However, the method of solely using theoretical and speculative projections, such as by a full function vector, has a problem in that the method does not match an actual situation in which a user uses a device. In other words, in the case of solely using the theoretical and speculative projections, such as by a full function vector, only the functional test is performed, while an actual usage environment, for example of a device user, is not considered. Thus, solely using theoretical and speculative projections inherently limits the accuracy of lifespan prediction. Furthermore, an excessive design or a vulnerable design may occur during the design of devices.

SUMMARY

An aspect of the present disclosure is to provide a device lifespan prediction method, a device design method, and a computer-readable storage medium, in which a device lifespan may be accurately predicted in consideration of an actual use environment, for example of a device user. The improved lifespan prediction results in improvements in the device design, improvements in production/manufacture of the device, and ultimately in a modified device or future versions of the device being produced/manufactured and provided to users.

According to an aspect of the present disclosure, a device lifespan prediction method includes executing software loaded on a target device having multiple physical block units and a memory, using a user scenario case selected from a user scenario pool, the user scenario pool being stored in the memory. The method also includes collecting usage information as collected usage information for at least one of the multiple physical constituent block units of the target device based on execution of the software. The method further includes predicting a lifespan of the target device as a predicted lifespan by analyzing the collected usage information.

According to an aspect of the present disclosure, a device lifespan prediction method includes executing software loaded on a target device having multiple physical constituent block units and a memory, using a user scenario case selected from a user scenario pool, the user scenario pool being stored in the memory. The method also includes collecting information as collected information regarding changes in a voltage and a temperature of a system based on execution of the software. The method further includes predicting a lifespan of the target device as a predicted lifespan by analyzing the collected information.

According to an aspect of the present disclosure, a device design method includes executing software loaded on a target device having multiple physical constituent blocks and a memory, using a user scenario case selected from a user scenario pool, the user scenario pool being stored in the memory. The method also includes collecting usage information as collected usage information for at least one of the multiple physical constituent block units of the target device based on execution of the software. The method further includes predicting a lifespan of the target device as a predicted lifespan by analyzing the collected usage information. The method moreover includes changing a design of the target device based on lifespan prediction information of the target device.

According to an aspect of the present disclosure, a computer readable storage medium includes commands written thereon and executable by a processor to perform a device lifespan prediction method. The device lifespan prediction method includes executing software loaded on a target device, using a user scenario case selected from a user scenario pool, the user scenario pool being stored in the memory. The device lifespan prediction method also includes collecting usage information as collected usage information for at least one of the multiple physical constituent block units of the target device based on execution of the software. The device lifespan prediction method further includes predicting a lifespan of the target device as a predicted lifespan by analyzing the collected usage information.

According to an aspect of the present disclosure, a computer readable storage medium includes commands written thereon and executable by a processor to perform a device design method. The device design method includes executing software loaded on a target device having multiple physical constituent blocks and a memory, using a user scenario case selected from a user scenario pool, the user scenario pool being stored in the memory. The device design method also includes collecting usage information as collected usage information for at least one of the multiple physical constituent block units of the target device based on execution of the software. The device design method further includes predicting a lifespan of the target device as a predicted lifespan by analyzing the collected usage information. The device design method moreover includes changing a design of the target device based on information of the predicted lifespan of the target device.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments of the present disclosure will be described with reference to the accompanying drawings.

Figure 1:
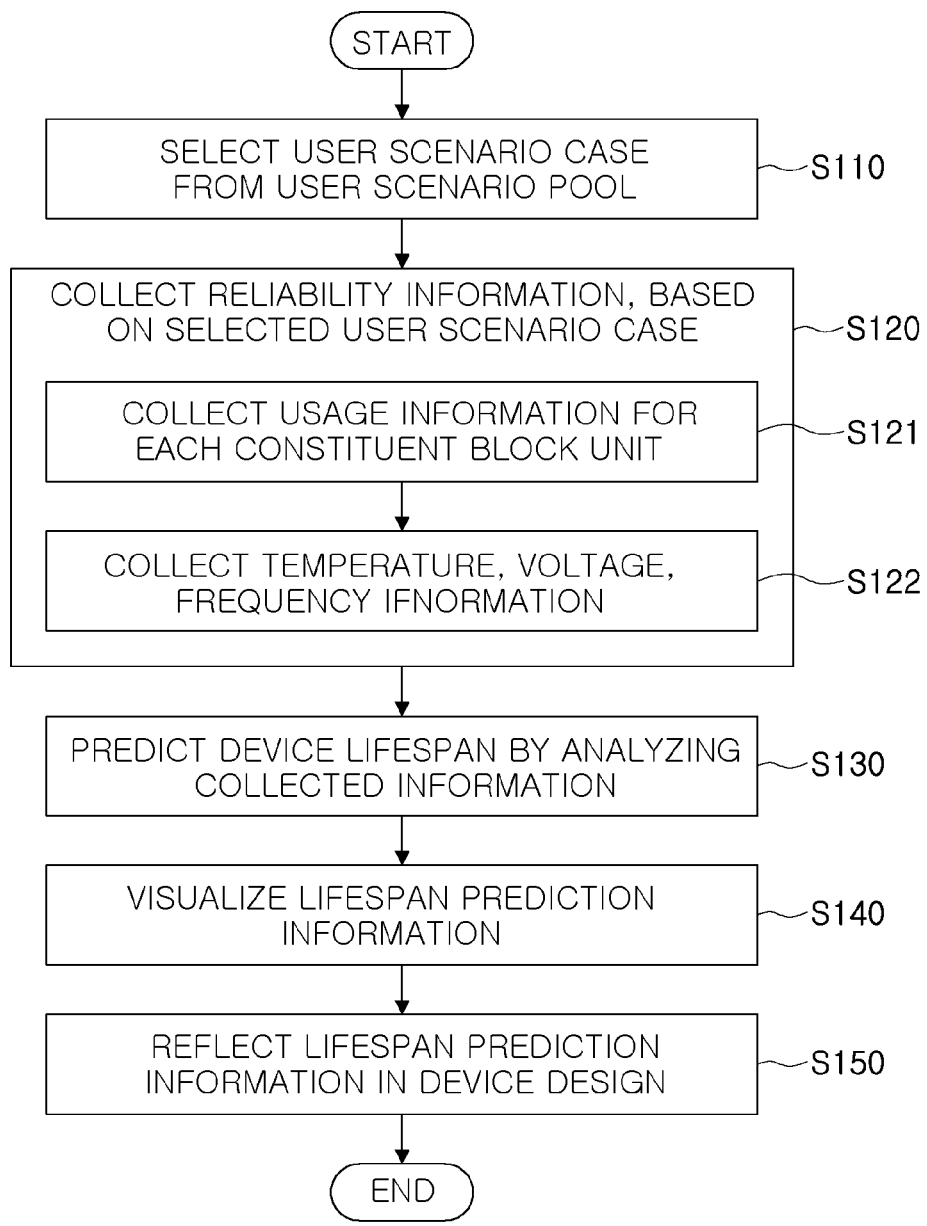
FIG. 1 is a flowchart illustrating a device lifespan prediction method according to an example embodiment of the present disclosure.

FIG. 1 is a flowchart illustrating a device lifespan prediction method according to an example embodiment.

Referring to FIG. 1, a scenario case may be selected from a user scenario pool including one or more user scenario cases in S110.

As described herein, the term "user scenario case" may refer to a scenario in which a user executes software installed in a device in an actual use environment. The user scenario case may be generated based on information regarding device requirements provided by a consumer of a target device, and/or based on analysis of a device usage pattern of a consumer of a target device. The target devices described herein have one or multiple physical constituent block units, such as circuits, circuitry, processors, cameras, transmitters, receivers, transceivers and so on. The target devices also have a memory that stores a user scenario pool which includes one or multiple user scenario cases which can be selected. Usage information of the different physical constituent block units may be monitored and collected, and serve as the basis of determinations described herein.

In detail, for example, when the target device is a semiconductor chip, examples of the user scenario case may include user scenarios with respect to many different types of devices that include and implement the target device/semiconductor chip. Different user scenario cases may be generated for types of devices, different models of a type of device, and even different embodiments of each model of a type of device in which the target device/semiconductor chip may be included and implemented. Examples of the different types of devices for which different user scenario cases are developed include a mobile terminal, an automobile, an IOT device, a PC, a TV or the like, in which a semiconductor chip may be included as the target device.

Further, each user scenario case may include information characteristic of use of at least one or any of the following:

Multimedia characteristics (audio, display, Wi-Fi display, or the like)
Video input/output characteristics (HDMI, eDP, or the like)
Communications characteristics (Wi-Fi, Bluetooth, ZigBee®, RF, or the like)
Camera characteristics (Preview, recording, snapshot, or the like)
Data storage characteristics (UFS, eMMC, cache memory, or the like)
Power management characteristics
Connectivity characteristics (USB, UART, I2C, SPI, PWM, PCIe, or the like)

Each of the characteristics noted above may be implemented by one or more than one of the different physical constituent block units described herein.

The information characteristics of each type describes above may include a number of uses, length of use, processing amount of each use, and similar types of derivable characteristics specific to uses of different types of capabilities of modern electronic devices. The information may be obtained from the monitoring of a device, for example by a kernel of the device, described herein.

As described above, the user scenario case may be generated based on information regarding device requirements provided by a consumer of a target device and/or based on analysis of a device usage pattern of the target device. The user scenario case may include a type of software to be installed on a device, an execution pattern or use pattern of the software, and the like, so that the lifespan prediction for the user scenario case will be based on these and other aspects specific to the user scenario case. Information of software in a user scenario case may therefore include type of software such as name of a program, format of a program, size of a program, execution requirements for the program and so on.

Then, information regarding reliability of a target device may be collected in S120 based on a selected user scenario case. In this case, operation S120 may include collecting usage information for each constituent block unit of the target device in S121, and collecting at least one of temperature information, voltage information, and operating frequency information in S122. To be completely clear, the information regarding reliability is information newly created as part of the process of FIG. 1, and is not information that existed previously. The information regarding reliability may be created and then collected according to an algorithm in the same way or a similar way that medical testing information is newly created and then collected when a patient is tested. Thus, the information is dynamically generated and created for the collection process, based on monitoring according to the user scenario cases described herein.

In detail, collecting information regarding reliability of a target device based on a selected user scenario case, may include executing software loaded on the target device by using a selected user scenario case. Collecting information regarding reliability of a target device may also include monitoring access information and operation information of a central processing unit (CPU), a graphics processing unit (GPU), a memory, or the like, based on the execution/executing of the software. Collecting information regarding reliability of a target device may further include monitoring voltage and temperature change information of an operating system of a system as well as the number of usages and a period of usage time of a respective constituent block unit such as a CPU or the like. The collected information may be used to identify correlations between access by the software, number of accesses, length of each access, which constituent block unit is accessed or otherwise used, amount of resources of a constituent block unit used in each access, and characteristics of the overall device such a voltage and temperature or other physical characteristics of the device.

In other words, according to an example embodiment, instead of only collecting reliability information through a functional test of the device, information regarding reliability of the target device during the (actual) loading and execution of the software on the target device may be collected by the user scenario case generated based on the information regarding device requirements and/or based on device usage pattern analysis. The device usage pattern analysis may result in device usage pattern analysis information used as the basis for the lifespan prediction. Thus, a lifespan prediction of the target device may be performed by sufficiently reflecting an actual operating environment of the target device by a user, thereby improving accuracy of lifespan prediction.

As noted above, the lifespan prediction can be used to change, update, revise, or otherwise improve a device design. The lifespan prediction can be used to determine which model or prototype of a device to produce/manufacture. The lifespan prediction can be used as the basis for production/manufacturing of a modified device or future models of a type of device.

A detailed method of collecting usage information for each constituent block unit of the target device in operation S120 will be described in detail with reference to FIG. 2.

Then, a lifespan of the device may be predicted by analyzing the collected information in S130.

In detail, the target device is operated by using the selected user scenario case. Afterwards, a degree of deterioration of the target device may be calculated using the collected information. As a result, the lifespan of the device may be predicted.

As described above, according to an example embodiment, usage information for each constituent block unit of the target device, based on the execution/excuting of software, is considered in the calculation of deterioration degree of the target device. As a result, lifespan prediction may be performed based on reflecting an actual operating environment of the target device.

In this case, the calculation of deterioration degree, and the device lifespan prediction, may be performed through a commercially available program, a reliability simulator, or the like. A detailed method therefor is known in the art, and thus, a detailed description thereof will be omitted.

Lifespan prediction information may be visualized as required, in S140.

According to an example embodiment, a degree of deterioration of the target device may be displayed, based on lifespan prediction information as basic information, and/or a lifespan extension status may be displayed based on the lifespan prediction. Accordingly, lifespan prediction information may be visualized along with other information (e.g., degree of deterioration, lifespan extension status) to provide the visualized lifespan prediction information to a device designer.

Furthermore, according to an example embodiment, the lifespan prediction information obtained as described above may be reflected in a device design in S150, and subsequently in production/manufacture of a modified model of a device or a new model of a device.

According to an example embodiment, use times of constituent block units can serve as the basis for lifespan prediction. For example, a difference in access times and/or number of accesses of respective constituent block units may be reflected based on the access information of each constituent block unit of the target device collected in operation S120 described above. The difference in access times/use times can be used to perform at least one of a change in design of the target device, a change in chip size, a change in product specification such as a lifespan warranty period, an operating voltage, temperature, or the like, a change in reliability margin, and a change in timing margin.

Thus, a chip size and yield suitable for a design of the device may be obtained. Moreover, device lifespan prediction is used to prevent or improve an excessive design or vulnerable design for a warranty of a lifespan of a product.

Further, an influence on the device of relevant software may be evaluated through the access information (e.g., access time, number of accesses) of each constituent block unit of the target device collected in operation S120 described above. As a result, capability for the development of software may be increased based on the evaluated influence through software policy research into extending a prediction lifespan of a device.

The lifespan predictions may vary based on numerous different factors as described herein, including number of uses and use times of constituent blocks, access of a kernel to constituent blocks, device requirement information from a consumer of the target device, device usage pattern analysis information of the target device, which software is loaded on the target device, characteristics of the target device that change during use such as voltage and temperature, and various other aspects described herein. A simple example of different lifespan predictions is that one result could be 72 months based on one set of factors, and another result could be 62 months based on another set of factors. Thus, the actual usage of a target device is analyzed to determine, approximate, calculate or otherwise project the lifespan of the target device.

The device lifespan prediction method described above with reference to FIG. 1 may be performed by a computing device, and the lifespan of a device may be predicted in association with a commercialized program, a reliability simulator, or the like.

In addition, according to an example embodiment, a computer readable storage medium stores commands executable by a processor. When executed by the processor, the commands may result in performance of respective operations of the device lifespan prediction method as illustrated in FIG. 1.

Figure 2:
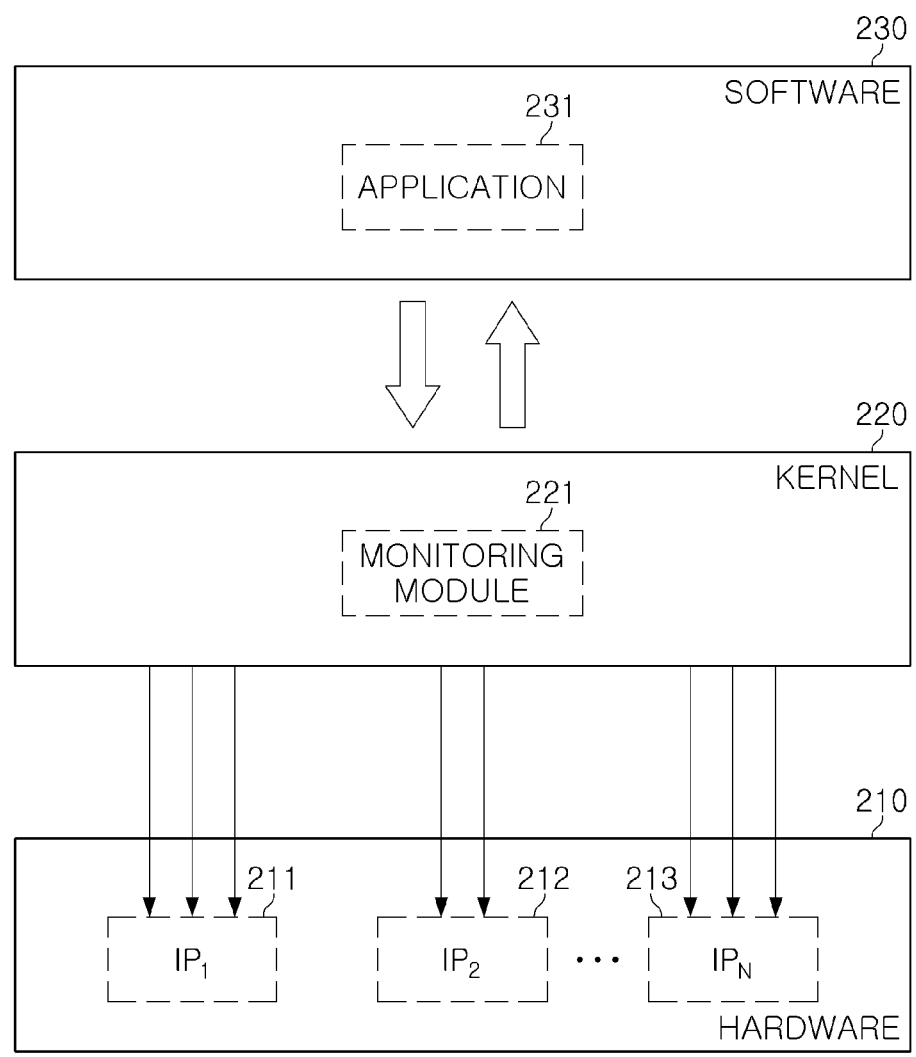
FIG. 2 is a drawing illustrating an example of collecting usage information for each constituent block unit, based on a user scenario case, according to an example embodiment of the present disclosure.

FIG. 2 is a drawing illustrating an example of collecting usage information for each constituent block unit based on a user scenario case, according to an example embodiment.

Referring to FIG. 2, hardware 210 corresponds to a target device, and the hardware 210 may include multiple block units 211, 212 and 213.

A kernel 220 may be located between the hardware 210 and software 230, as a core part of an operating system (OS), may manage the software 230 during execution, and may manage resources for the hardware 210. For example, the kernel 220 may access a required portion of the hardware 210 to perform a predetermined operation when any application 231 is executed.

Further, the software 230 including at least one application such as application 231 may be loaded on the hardware 210, to operate the hardware 210.

According to an example embodiment, the kernel 220 may include a monitoring module 221. Access information, such as an access time, the number of accesses or the like, for each constituent block unit of the hardware 210 by the kernel 220, may be monitored through the monitoring module 221 while the application 231 is executed according to the selected user scenario case.

A lifespan of the target device may be predicted using the monitored information as described above with reference to FIG. 1.

Figure 3:
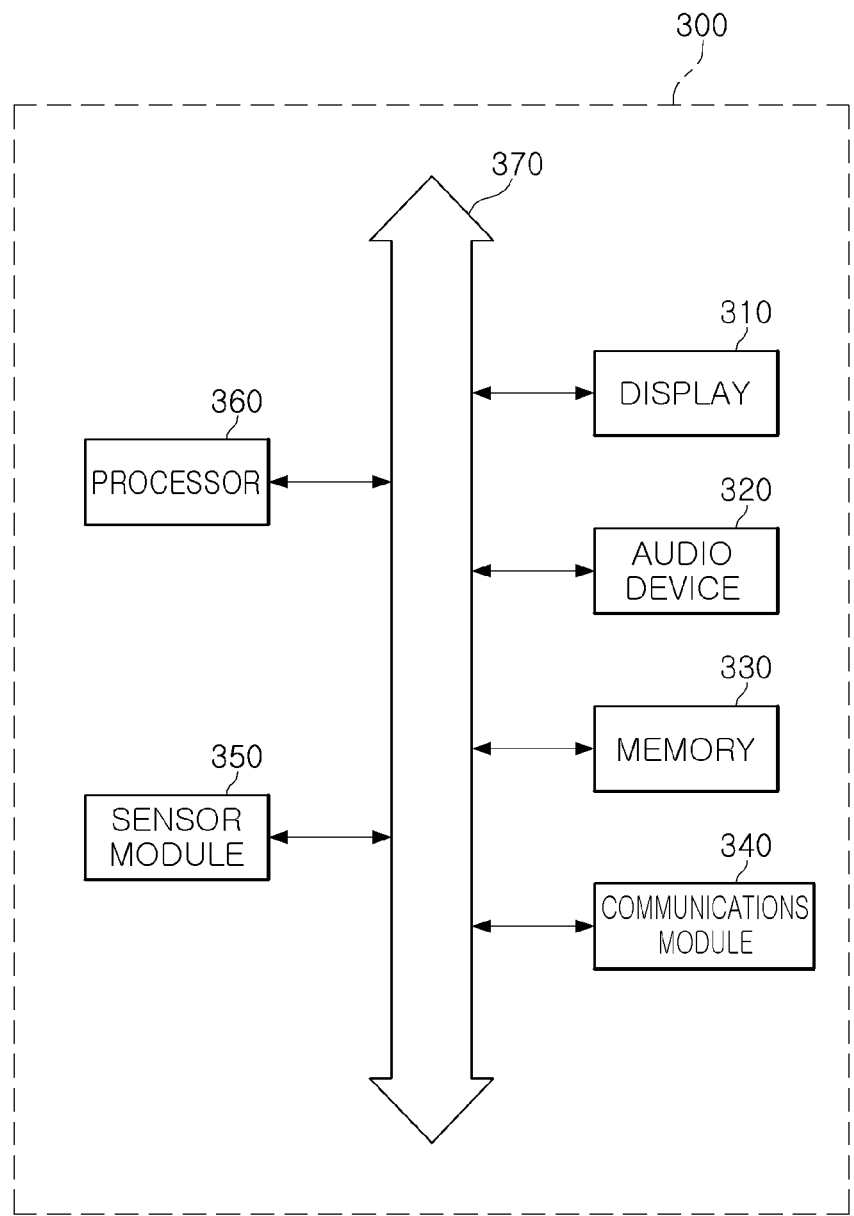
FIG. 3 is a schematic diagram illustrating an application processor (AP) to which an example embodiment of the present disclosure may be applied.

FIG. 3 is a schematic diagram illustrating an application processor (AP) to which an example embodiment of the present disclosure may be applied.

As the term is used herein, an application processor may be a device that processes applications (e.g., software applications) using at least one processor. Accordingly, the term application processor may refer to an individual processor, or to a device that includes multiple tangible and non-transitory modules including the processor. Examples of an application processor used herein include different types of devices such as a smart phone, mobile computer, tablet computer, wearable device, and numerous other forms of devices and systems with at least one processor for processing applications. With reference to FIG. 3, an application processor 300, to which an example embodiment may be applied, may include a display 310, an audio device 320, a memory 330, a communications module 340, a sensor module 350, a processor 360, and the like. The respective constituent block units of the application processor 300 may communicate with each other via a bus 370 to transfer data to each other. The constituent block units of the application processor 300 are physical block units such as different circuits and circuitry. Additionally, insofar as a memory 330 may be separate from the constituent block units, the memory 330 may store the user scenario pool with multiple user scenario cases that can each be selected.

In an example embodiment, when a lifespan of the application processor 300 is predicted, a variety of activities and characteristics of activities may be monitored and used in the prediction of the lifespan of the application processor 300. For example, the monitoring may include monitoring the number of accesses to respective constituent elements of the application processor 300, and a time of access thereto, or the like, by a kernel, during execution of any application according to a selected user scenario case.

Thus, degrees of deterioration of respective components of the application processor 300 may be obtained in consideration of an actual use environment of the target device. A lifespan of the application processor 300 may be accurately predicted based on the obtained deterioration degrees.

Figure 4:
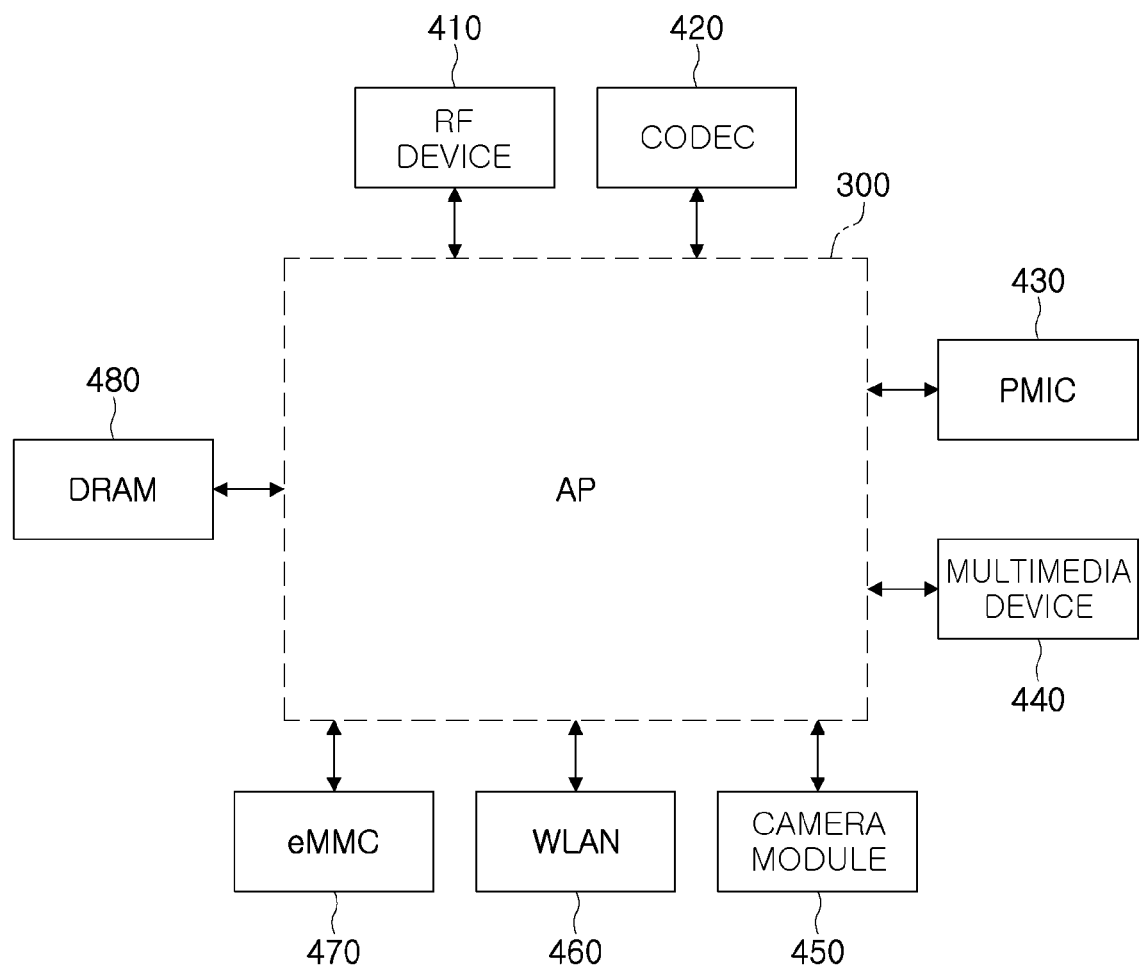
FIG. 4 is a schematic diagram illustrating a relationship between an application processor to which an example embodiment of the present disclosure may be applied, and peripheral devices thereof.

FIG. 4 is a schematic diagram illustrating a relationship between an application processor to which an example embodiment may be applied, and peripheral devices thereof.

With reference to FIG. 4, an application processor 300 may be connected to various peripheral devices. For example, an application processor may be connected to a radio frequency (RF) device 410, a codec 420, a power management integrated circuit (PMIC) 430, a multimedia device 440, a camera module 450, a wireless local area network (WLAN) device 460, an embedded multimedia controller (eMMC) 470, and a dynamic random-access memory (DRAM) 480, and the like.

The device lifespan prediction method described above with reference to FIG. 1 may also be extendedly applied to an entire system in which the application processor 300 and various peripheral devices are configured to be connected to each other, as is.

For example, a lifespan of the entire system including the application processor 300 may be predicted. In this example embodiment, the number and time of accesses of the application processor 300 to respective peripheral devices during execution of any application according to a selected user scenario case may be monitored.

Thus, degrees of deterioration of respective constituent elements of a relevant system may be obtained in consideration of an actual use environment of the system. The lifespan of the system may be accurately predicted based on the deterioration degrees.

As set forth above, according to example embodiments, a device lifespan prediction method, a device design method, and a computer readable storage medium are provided in which a device lifespan may be accurately predicted using a user scenario provided by considering an actual use environment of a device user. The mechanisms described herein are not dependent particularly on the type or meaning of the information dynamically generated by the monitoring of the actual use environment. Rather, the predicted lifecycle is based on the monitoring, which in turn is based on specific parameters and characteristics of the selected user scenario case described herein.

While example embodiments have been shown and described above, it will be apparent to those skilled in the art that modifications and variations could be made without departing from the scope of the present disclosure as defined by the appended claims.

What is claimed is:

1. A device lifespan prediction method, comprising:
executing software loaded on a target device having a plurality of physical constituent block units and a memory, using a user scenario case selected from a user scenario pool, the user scenario pool being stored in the memory;
collecting usage information as collected usage information for at least one of the plurality of physical constituent block units of the target device based on execution of the software; and
predicting a lifespan of the target device as a predicted lifespan by analyzing the collected usage information,
wherein the user scenario case comprises information of software to be loaded on the target device and an execution pattern of the software, and
the predicted lifespan is predicted based on the information of software loaded on the target device and the execution pattern of the software.

2. The method of claim 1,
wherein collecting usage information for at least one of the plurality of physical constituent block units of the target device comprises collecting a number of uses and an amount of usage time of at least one of the plurality of physical constituent block units based on the executing of the software, and
the predicted lifespan is predicted based on the number of uses and the amount of usage time of at least one of the plurality of physical constituent block units.

3. The method of claim 1,
wherein collecting usage information for at least one of the plurality of physical constituent block units of the target device comprises collecting information regarding access of a kernel to at least one of the plurality of physical constituent block units during the executing of the software, and
the predicted lifespan is predicted based on the information regarding access of the kernel to at least one of the plurality of physical constituent block units.

4. The method of claim 1,
wherein the user scenario case is generated, based on at least one of device requirement information provided from a consumer of the target device, and device usage pattern analysis information based on analyzing usage of the target device by the consumer of the target device.

5. The method of claim 1,
wherein the predicting a lifespan of the target device is performed by calculating a degree of deterioration of the target device using usage information of at least one of the plurality of physical constituent block units of the target device, and predicting the lifespan of the target device based on the degree of deterioration of the target device.

6. The method of claim 1, further comprising visualizing lifespan prediction information of the target device.

7. A device lifespan prediction method, comprising:

executing software loaded on a target device having a plurality of physical constituent block units and a memory, using a user scenario case selected from a user scenario pool, the user scenario pool being stored in the memory;

collecting information as collected information regarding changes in a voltage and a temperature of a system based on execution of the software; and predicting a lifespan of the target device as a predicted lifespan by analyzing the collected information, wherein the predicting a lifespan of the target device is performed by calculating a degree of deterioration of the target device using information regarding changes in a voltage and a temperature of a system and usage information of at least one of the plurality of physical constituent block units of the target device, and predicting the lifespan of the target device based on the degree of deterioration of the target device.

8. The method of claim 7, further comprising:

collecting usage information for at least one of the plurality of physical constituent block units of the target device based on the executing of the software, wherein the predicted lifespan is predicted based on the usage information for at least one of the plurality of physical constituent block units of the target device.

9. The method of claim 8, wherein collecting usage information for at least one of the plurality of physical constituent block units of the target device comprises collecting a number of uses and an amount of usage time of at least one of the plurality of physical constituent block units based on the executing of the software, and the predicted lifespan is predicted based on the number of uses and the amount of usage time of at least one of the plurality of physical constituent block units.

10. The method of claim 8, wherein collecting usage information for at least one of the plurality of physical constituent block units of the target device comprises collecting information regarding access of a kernel to at least one of the plurality of physical constituent block units during the executing of the software, and the predicted lifespan is predicted based on the information regarding access of the kernel to at least one of the plurality of physical constituent block units.

11. The method of claim 7, wherein the user scenario case is generated, based on at least one of device requirement information provided from a consumer of the target device, and device usage pattern analysis information based on analyzing usage of the target device by the consumer of the target device.

12. The method of claim 7, wherein the user scenario case comprises information of software to be loaded on the target device and an execution pattern of the software, and the predicted lifespan is predicted based on the information of software to be loaded on the target device and the execution pattern of the software.

13. The method of claim 7, further comprising visualizing lifespan prediction information of the target device.

14. A device design method, comprising:

executing software loaded on a target device having a plurality of physical constituent block units and a memory, using a user scenario case selected from a user scenario pool, the user scenario pool being stored in the memory;

collecting usage information as collected usage information for at least one of the plurality of physical constituent block units of the target device based on execution of the software;

predicting a lifespan of the target device as a predicted lifespan by analyzing the collected usage information; and changing a design of the target device, based on information of the predicted lifespan of the target device.

15. The method of claim 14, wherein collecting usage information for at least one of the plurality of physical constituent block units of the target device comprises collecting access information of a kernel regarding access of the kernel to at least one of the plurality of physical constituent block units during the executing of the software, and the predicted lifespan is predicted based on the access information of the kernel to at least one of the plurality of physical constituent block units.

16. The method of claim 15, wherein the changing a design of the target device is performed by performing at least one of a change in design of the target device, a change in chip size, a change in product specification, a change in reliability margin, and a change in timing margin, by reflecting a difference in access times of at least one of the plurality of physical constituent block units based on the access information of the kernel.

17. The method of claim 14, wherein the user scenario case comprises information of software to be loaded on the target device and an execution pattern of the software, and the predicted lifespan is predicted based on the information of software loaded on the target device and the execution pattern of the software.

18. The method of claim 14, wherein collecting usage information for at least one of the plurality of physical constituent block units of the target device comprises collecting a number of uses and an amount of usage time of at least one of the plurality of physical constituent block units based on the executing of the software, and the predicted lifespan is predicted based on the number of uses and the amount of usage of at least one of the plurality of physical constituent block units.

19. The method of claim 14, wherein the user scenario case is generated, based on at least one of device requirement information provided from a consumer of the target device, and device usage pattern analysis information based on analyzing usage of the target device by the consumer of the target device.

20. The method of claim 14 wherein the predicting a lifespan of the target device is performed by calculating a degree of deterioration of the target device using usage information of at least one of the plurality of physical constituent block units of the target device, and predicting the lifespan of the target device based on the degree of deterioration of the target device.

* * * * *